(12) United States Patent
Tojo (10) Patent No.: US 12,247,665 B2
(45) Date of Patent: Mar. 11, 2025

(54) SEAL STRUCTURE WITH ANNULAR PACKING

(71) Applicant: MARUYAMA MFG. CO., INC., Tokyo (JP)

(72) Inventor: Nobuo Tojo, Tokyo (JP)

( * ) Notice: Subject to any disclaimer, the term of this patent is extended or adjusted under 35 U.S.C. 154(b) by 0 days.

(21) Appl. No.: 18/343,745

(22) Filed: Jun. 29, 2023

(65) Prior Publication Data

US 2024/0003422 A1    Jan. 4, 2024

(30) Foreign Application Priority Data

Jul. 4, 2022    (JP) ................................ 2022-107781

(51) Int. Cl.
*F16J 15/3284* (2016.01)

(52) U.S. Cl.
CPC ................................ *F16J 15/3284* (2013.01)

(58) Field of Classification Search
CPC ........ F16J 15/3284; F16J 15/18; F16J 15/181; F16J 15/26
See application file for complete search history.

(56) References Cited

U.S. PATENT DOCUMENTS

| | | | |
|---|---|---|---|
| 2003/0184018 A1* | 10/2003 | Upton | F16J 15/004 277/318 |
| 2018/0163719 A1 | 6/2018 | Tojo | |
| 2019/0085978 A1* | 3/2019 | Chase | F04B 53/02 |
| 2020/0182240 A1* | 6/2020 | Nowell | F16J 15/184 |

FOREIGN PATENT DOCUMENTS

JP    2018-096292    6/2018

* cited by examiner

*Primary Examiner* — Gilbert Y Lee
(74) *Attorney, Agent, or Firm* — SOEI PATENT & LAW FIRM (57) ABSTRACT

A seal structure includes an annular female adapter, at least one annular packing, and an annular male adapter. The male adapter and the female adapter sandwich the at least one packing. The at least one packing includes a packing convex portion adjacent to the female adapter and a packing concave portion adjacent to the male adapter. The male adapter includes an adapter convex portion that contacts the packing concave portion. The female adapter includes an adapter concave portion that contacts the packing convex portion. In a state sandwiched between the male adapter and the female adapter, the at least one packing includes an inner diameter that is smaller than a diameter of the reciprocating member. The female adapter includes an inner diameter that is smaller than the diameter of the reciprocating member.

16 Claims, 4 Drawing Sheets

SEAL STRUCTURE WITH ANNULAR PACKING

CROSS-REFERENCE TO RELATED APPLICATIONS

This application is based upon and claims the benefit of priority from Japanese Patent Application No. 2022-107781, filed on Jul. 4, 2022, the entire contents of which are incorporated herein by reference.

BACKGROUND

Field

The present disclosure relates to a seal structure and a reciprocating pump.

Description of the Related Art

Japanese Unexamined Patent Application Publication No. 2018-96292 discloses a reciprocating pump in which a plunger moves in a reciprocating manner in a cylinder. This reciprocating pump is provided with a seal.

SUMMARY

Disclosed herein is an example seal structure. The seal structure may be configured to be located between a pomp casing including an inner space and a columnar reciprocating member moving in a reciprocating manner in an axial direction in the inner space. The seal structure may include an annular female adapter located in the inner space, at least one annular packing located adjacent to the female adapter and an annular male adapter located adjacent to the at least one packing. The at least one packing may include a packing convex portion adjacent to the female adapter and a packing concave portion adjacent to the male adapter. The male adapter may include an adapter convex portion coming into contact with the packing concave portion. The female adapter may include an adapter concave portion coming into contact with the packing convex portion. The male adapter and the female adapter may sandwich the at least one packing in the axial direction such that the at least one packing may include an inner diameter that is smaller than a diameter of the reciprocating member. The female adapter may include an inner diameter that is smaller than the diameter of the reciprocating member.

In some examples, the at least one packing may include a V-shaped cross-section, and both the at least one packing and the female adapter may be formed of a resin material.

In some examples, the packing may include a first surface including the packing convex portion, and a second surface located at an opposite side to the first surface in the axial direction and including the packing concave portion.

In some examples, the female adapter may include an end portion including the adapter concave portion coming into contact with the packing convex portion. The end portion may include an inner diameter that is smaller than the diameter of the reciprocating member.

In some examples, the end portion of the female adapter may include an inner diameter that is larger than the diameter of the reciprocating member in an unloaded state in which the at least one packing is not sandwiched between the male adapter and the female adapter.

In some examples, the end portion of the female adapter may include an inner diameter that is smaller than the diameter of the reciprocating member in an unloaded state in which the at least one packing is not sandwiched between the male adapter and the female adapter.

In some examples, the convex portion of the at least one packing and the concave portion of the female adapter may include V-shaped cross-sections. An angle formed by two sides forming the packing convex portion in a cross-sectional view of the at least one packing is larger than an angle formed by two sides forming the adapter concave portion in a cross-section of the female adapter in an unloaded state in which the at least one packing is not sandwiched between the male adapter and the female adapter.

In some examples, the at least one packing and the female adapter are formed of homogeneous materials.

In some examples, the at least one packing and the female adapter have 50% or more of common components.

Additionally, an example reciprocating pump may include a cylinder portion, a plunger which may be located in the cylinder portion and moves in a reciprocating manner in an axial direction in the cylinder portion, and a seal structure located in the cylinder portion. The seal structure may include an annular first adapter fixed to the cylinder portion and located to surround the plunger, an annular second adapter fixed to the cylinder portion and located to surround the plunger, and an annular packing located between the first adapter and the second adapter in the axial direction and coming in contact with an outer peripheral surface of the plunger. The first adapter and the second adapter may sandwich the packing in the axial direction. An inner diameter of the first adapter may be smaller than an outer diameter of the plunger.

In some examples, the cylinder portion may include an annular stepped portion that protrudes toward an axis of the cylinder portion from an inner peripheral surface of the cylinder portion. The packing may include a packing convex portion coming into contact with the first adapter. The first adapter may include an adapter concave portion attached to the packing convex portion, and a rear portion located at opposite side to the adapter concave portion in the axial direction and coming into contact with the stepped portion.

In some examples, the first adapter may be configured so that an inner diameter becomes smaller than an outer diameter of the plunger when the packing convex portion is received in the adapter concave portion to enlarge the adapter concave portion.

In some examples, the second adapter may include an adapter convex portion coming into contact with the packing. The packing may include a packing concave portion located at an opposite side to the packing convex portion and attached to the adapter convex portion.

In some examples, the packing concave portion may be enlarged when the adapter convex portion enters the packing concave portion.

In some examples, the packing may include a packing convex portion and a packing concave portion located at an opposite side to the packing convex portion in the axial direction. The first adapter may include an adapter concave portion coming into contact with the packing convex portion and the second adapter may include an adapter convex portion coming into contact with the packing concave portion.

In some examples, the packing convex portion and the adapter concave portion may include V-shaped cross-sections. An angle formed by two sides forming the adapter concave portion in a cross-sectional view of the first adapter is smaller than an angle formed by two sides forming the packing convex portion in a cross-sectional view of the packing in an unloaded state in which the packing is not sandwiched between the first adapter and the second adapter.

In some examples, the packing concave portion and the packing convex portion may include V-shaped cross-sections. An angle formed by two sides forming the packing concave portion in a cross-sectional view of the packing is smaller than an angle formed by the two sides forming the packing convex portion in an unloaded state in which the packing is not sandwiched between the first adapter and the second adapter.

In some examples, the packing concave portion and the adapter convex portion may include V-shaped cross-sections. An angle formed by two sides forming the packing concave portion in a cross-sectional view of the packing is smaller than an angle formed by two sides forming the adapter convex portion in a cross-sectional view of the second adapter in an unloaded state in which the packing is not sandwiched between the first adapter and the second adapter.

In some examples, the second adapter may include an outer diameter that is smaller than an inner diameter of the cylinder portion.

Some examples may include a communicating pipe which is located in the cylinder portion and comes into contact with the second adapter in the axial direction. The communicating pipe may include an annular protruding stepped portion which protrudes outward in a radial direction, and the cylinder portion may include an annular recessed stepped portion which is recessed outward in the radial direction and comes into contact with the protruding stepped portion to position the communicating pipe.

DETAILED DESCRIPTION

In the following description, with reference to the drawings, the same reference numbers are assigned to the same components or to similar components having the same function, and overlapping description is omitted.

Hereinafter, an example reciprocating pump will be described with reference to the accompanying drawings. As an example reciprocating pump, a so-called horizontal triple plunger pump in which three plungers constituting reciprocating members are arranged in parallel in the horizontal direction will be described. Additionally, in the following description, "up" and "down" are defined with reference to the state in which the reciprocating pump is placed on a horizontal plane, "front" and "rear" are defined with reference to the axial direction of the reciprocating member, the pump chamber side is defined as the front, and the crankcase side is defined as the rear.

Figure 1:
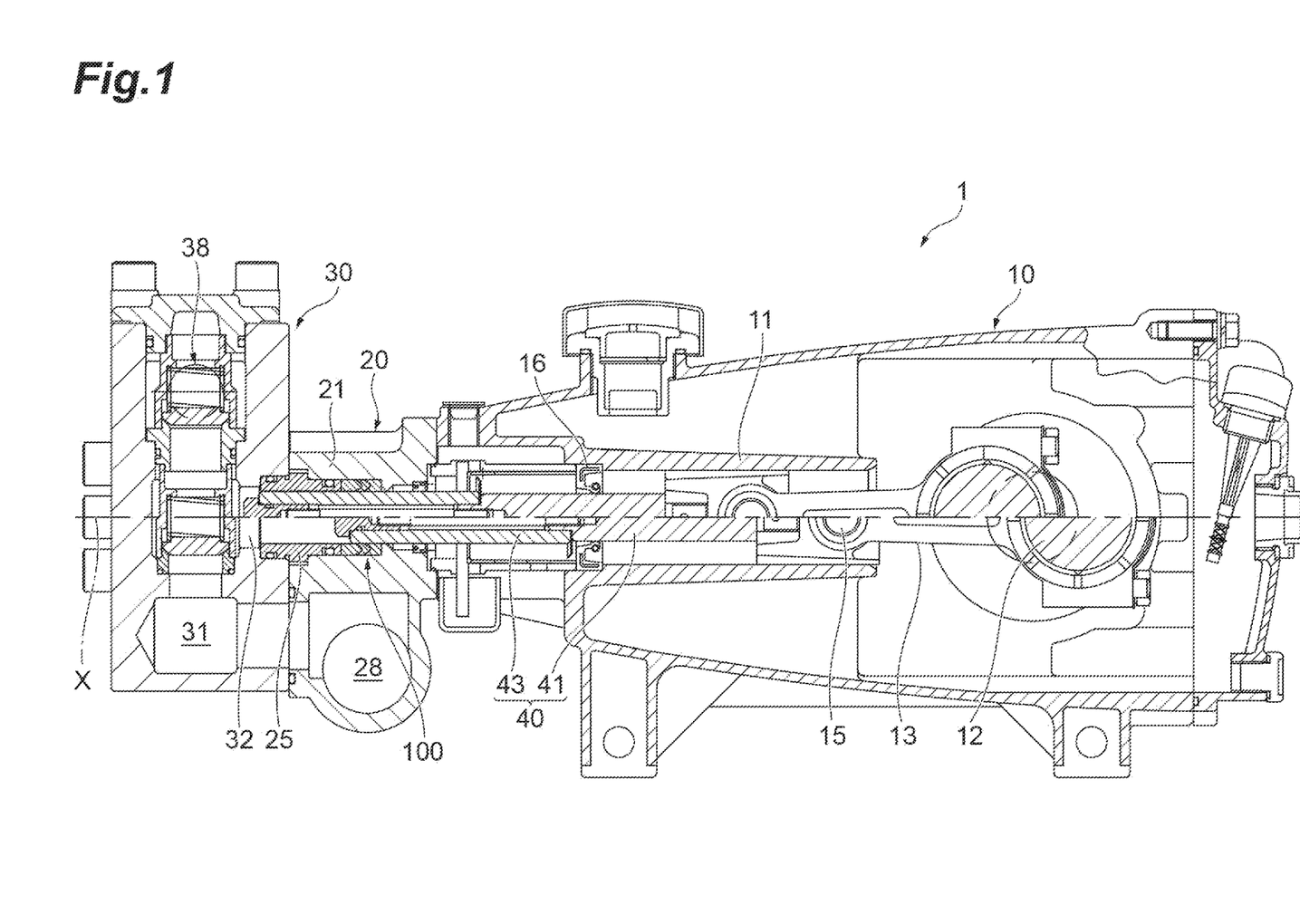
FIG. 1 is a cross-sectional view illustrating an example reciprocating pump.
Figure 2:
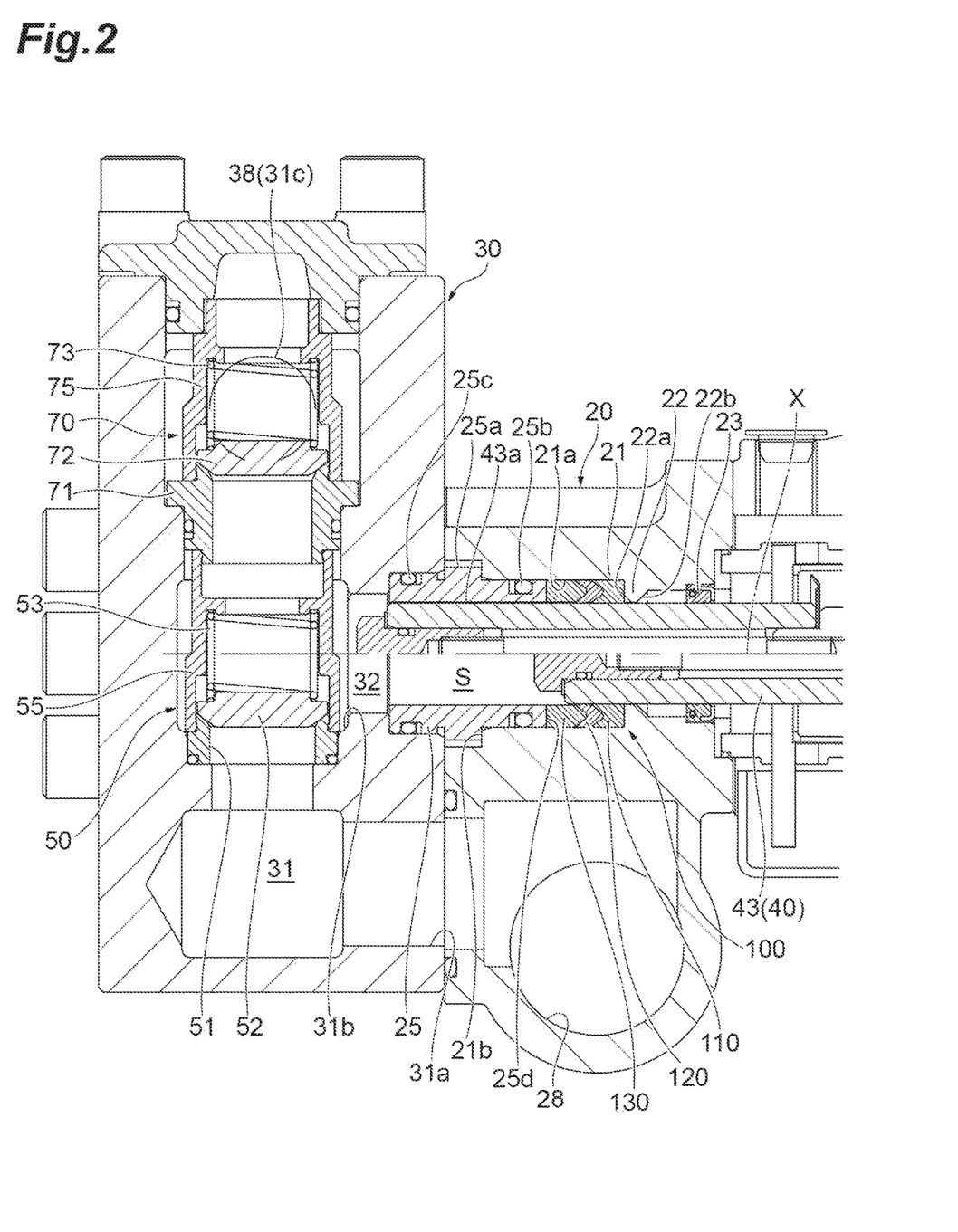
FIG. 2 is an enlarged cross-sectional view illustrating the reciprocating pump of FIG. 1.

FIG. 1 is a cross-sectional view illustrating one of three plunger pumps constituting the reciprocating pump. In an example reciprocating pump 1, three pump configurations illustrated in FIG. 1 are arranged side by side in the horizontal direction (perpendicular to the cross-sectional view of the figure). FIG. 2 is a partially enlarged view of FIG. 1. As illustrated in FIG. 1, the reciprocating pump 1 performs a pump action in a pump chamber 32 provided at a tip of a cylinder portion as a reciprocating member 40 moves in a reciprocating manner in a cylinder portion.

The reciprocating pump 1 includes a crankcase 10, a first manifold 20, and a second manifold 30. The crankcase 10, the first manifold 20, and the second manifold 30 are integrally connected to each other. The second manifold 30 is fixed to the crankcase 10 through the first manifold 20 by a plurality of fastening means (for example, bolts and the like). Additionally, in FIGS. 1 and 2, the axis X of the reciprocating member 40 is indicated by a dashed line. In FIGS. 1 and 2, a state in which the reciprocating member 40 is advanced and positioned at the top dead center is illustrated at the position above the axis X. And a state in which the reciprocating member 40 is retreated and positioned at the bottom dead center is illustrated at the position below the axis X.

The crankcase 10 is hollow A crankshaft 12, a connecting rod 13 rotatably connected to the crankshaft 12, a piston pin 15 rotatably connecting a plunger rod 41 to the connecting rod 13, and the like are arranged in the crankcase 10 and these members constitute a drive unit that reciprocates the reciprocating member 40 along the axis X. Additionally, the plunger rod 41 constitutes the rear half of the reciprocating member 40.

The crankcase 10 includes a cylinder portion 11. The cylinder portion 11 has a cylindrical shape and has an axial direction orthogonal to the axial direction of the crankshaft 12. The piston pin 15 and the tip portion of the connecting rod 13 can be arranged in the cylinder portion 11.

The crankcase 10 is filled with oil for lubricating and cooling the drive unit. An oil seal 16 for preventing the leakage of the oil in the crankcase 10 is disposed at an end portion on the side of the first manifold 20 of the cylinder portion 11. The oil seal 16 is in liquid-tight sliding contact with the outer peripheral surface of the plunger rod 41 that constitutes the reciprocating member 40. The reciprocating member 40 moves in a reciprocating manner in the front and rear direction through the connecting rod 13 and the piston pin 15 as the crankshaft 12 rotates.

The first manifold 20 is disposed at the front end of the crankcase 10. Further, the second manifold 30 is disposed at the front end of the first manifold 20. The first manifold 20 includes a cylinder portion 21 (see FIG. 2) having a common center axis X with the cylinder portion 11. The cylinder portion 21 penetrates the first manifold 20 in the front and rear direction. A plunger 43 that constitutes the front half of the reciprocating member 40 is disposed in the cylinder portion 21. The plunger 43 moves in a reciprocating manner in the front and rear direction in the cylinder portion 21 in accordance with the rotation of the crankshaft 12.

As illustrated in FIG. 2, an annular stepped portion 22 that protrudes toward the axis X is formed on an inner peripheral surface 21a of the cylinder portion 21. The stepped portion 22 includes a front surface 22a which is perpendicular to the axial direction and a rear surface 22b which increases in diameter backward in cross-sectional view. An annular U-packing 23 is disposed behind the stepped portion 22 in the cylinder portion 21. The U-packing 23 seals a gap between the inner peripheral surface 21a of the cylinder portion 21 and an outer peripheral surface 43a of the plunger 43.

A communicating pipe 25 which is connected to the second manifold 30 is provided at the front end of the cylinder portion 21. For example, the communicating pipe 25 is formed in a cylindrical shape by metal or the like. The communicating pipe 25 is fitted to the cylinder portion 21 to protrude forward by a predetermined length from the cylinder portion 21. A stepped portion 21b which is recessed radially outward is formed at the front end of the cylinder portion 21. Further, an annular stepped portion 25a which protrudes radially outward is formed at the center of the communicating pipe 25 in the front and rear direction. When the communicating pipe 25 is fitted into the cylinder portion 21 from the front side of the cylinder portion 21, the stepped portion 25a of the communicating pipe 25 and the stepped portion 21b of the cylinder portion 21 come into contact with each other to position the communicating pipe 25. Accordingly, the distance from the rear end of the communicating pipe 25 to the stepped portion 22 is determined. Further, the distance of the communicating pipe 25 that protrudes forward from the first manifold 20 is determined. An O-ring 25b is provided at the rear end of the communicating pipe 25. A gap between the outer periphery of the communicating pipe 25 and the inner periphery of the cylinder portion 21 is sealed by the O-ring 25b. The stepped portion 21b is an example of a recessed stepped portion and the stepped portion 25a is an example of a protruding stepped portion.

An example seal structure body 100 is disposed in the cylinder portion 21. The seal structure body 100 is disposed between the communicating pipe 25 and the stepped portion 22. The seal structure body 100 seals a gap between the inner peripheral surface 21a of the cylinder portion 21 and the outer peripheral surface 43a of the plunger 43 on the front side of the stepped portion 22. The seal structure body 100 has pressure resistance higher than that of the U-packing 23.

Further, the first manifold 20 includes an inlet 28 for introducing working liquid, for example, water (see FIG. 1). The inlet 28 communicates with a flow path 31 formed in the second manifold 30. The inlet 28 is positioned below the cylinder portion 21.

The second manifold 30 includes the pump chamber 32. The communicating pipe 25 that protrudes forward from the first manifold 20 is fitted into the pump chamber 32. In some examples, since the communicating pipe 25 is accommodated across the inside of the second manifold 30 and the inside of the first manifold 20, the second manifold 30 and the first manifold 20 are connected to each other through the communicating pipe 25. An O-ring 25c is provided at the front end of the communicating pipe 25. A gap between the outer periphery of the communicating pipe 25 and the inner periphery of the pump chamber 32 is sealed by the O-ring 25c.

The flow path 31 of the second manifold 30 communicates with the inlet 28 of the first manifold 20 and also communicates with the outlet 38 formed in the second manifold 30. In some examples, the flow path 31 connects the inlet 28 and the outlet 38. Further, the flow path 31 also communicates with the pump chamber 32 at a position from the inlet 28 to the outlet 38. The flow path 31 opens backward at the lower portion of the second manifold 30 and communicates with the inlet 28 through an opening 31a. Further, the flow path 31 extends in the up and down direction, communicates with the pump chamber 32 at the opening 31b formed at the center in the up and down direction, and communicates with the outlet 38 at the opening 31c formed at the upper portion.

A valve assembly 50 for water absorption and a valve assembly 70 for discharge are accommodated in the flow path 31. The example valve assembly 50 includes a tubular valve seat 51, a valve 52 which seals the valve seat 51, a biasing member (e.g., compressed coil spring) 53 which biases the valve 52 toward the valve seat 51, and a container 55 which accommodates the biasing member 53 and the valve 52. The valve assembly 50 is disposed in the flow path so that the valve 52 is positioned between the opening 31b communicating with the pump chamber 32 and the opening 31a communicating with the inlet 28.

Further, the example valve assembly 70 includes a tubular valve seat 71, a valve 72 which seals the valve seat 71, a biasing member (e.g., compressed coil spring) 73 which biases the valve 72 toward the valve seat 71, and a container 75 which accommodates the biasing member 73 and the valve 72. The valve assembly 70 is disposed in the flow path so that the valve 72 is positioned between the opening 31b communicating with the pump chamber 32 and the opening 31c communicating with the outlet 38.

The seal structure body 100 will be further described. The seal structure body 100 constitutes a seal structure by being disposed between the cylinder portion (space forming member) 21 forming the columnar inner space S and the columnar plunger 43 (reciprocating member) moving in the inner space S in a reciprocating manner. Additionally, a columnar inner space S is defined by the inner peripheral surface 21a of the cylinder portion 21, the front surface 22a of the stepped portion 22 formed in the cylinder portion 21, and a rear surface 25d of the communicating pipe 25.

Figure 3:
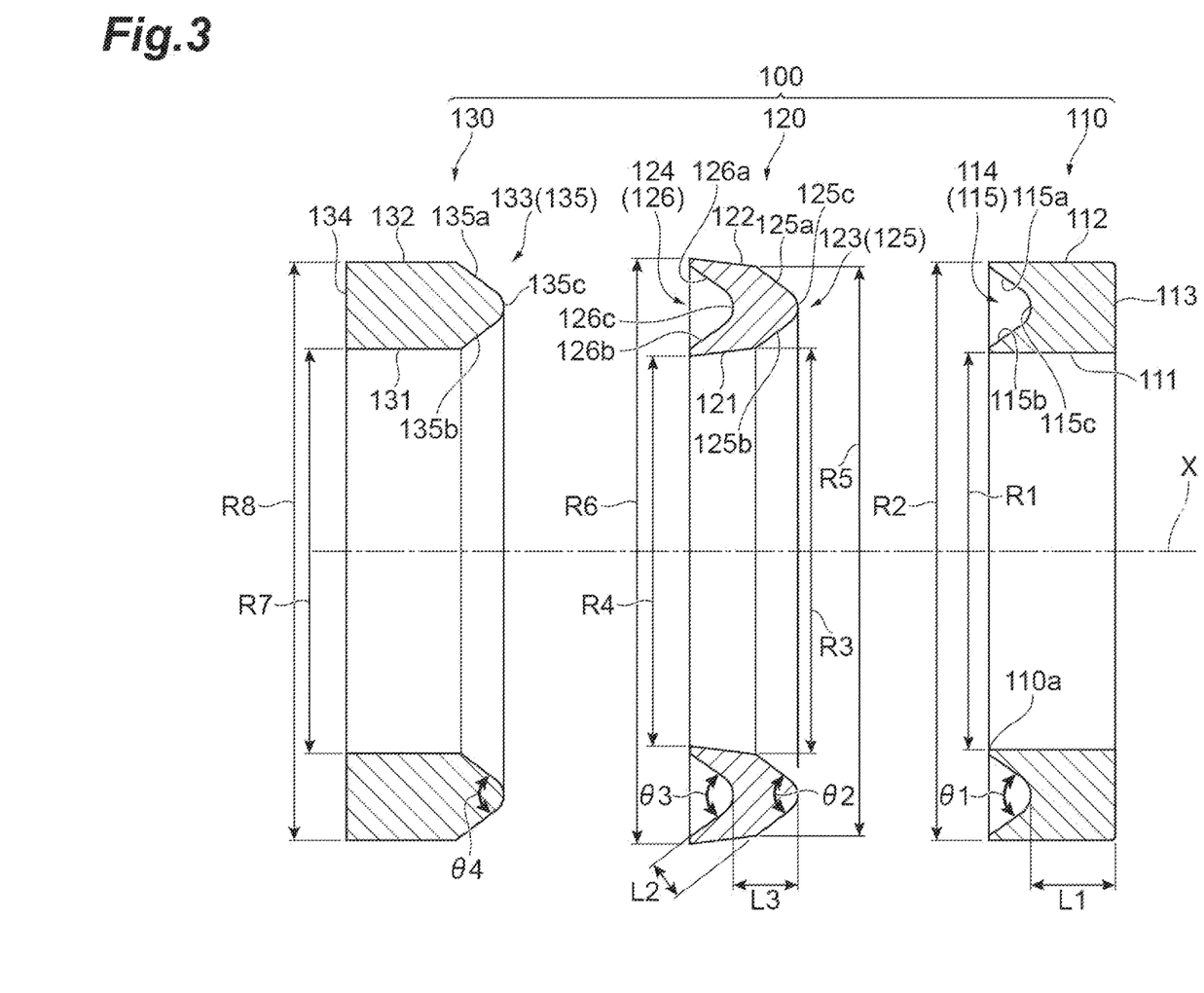
FIG. 3 is an exploded cross-sectional view describing an example seal structure.

FIG. 3 is an exploded cross-sectional view illustrating an example seal structure body 100. As illustrated in FIG. 3, the seal structure body 100 includes a female adapter 110 (an example of a first adapter), a V-packing 120 (an example of packing), and a male adapter 130 (an example of a second adapter). The female adapter 110 has an annular shape and is disposed in the inner space S so that surround the plunger 43. The female adapter 110 is fixed to the cylinder portion 21.

The female adapter 110 includes an inner peripheral surface 111 which faces the plunger 43 and an outer peripheral surface 112 which is on the side opposite to the inner peripheral surface 111 in the radial direction. Further, the female adapter 110 includes a rear surface 113 (an example of rear portion) which is disposed on one side in the axial direction and a front surface 114 which is disposed on the side opposite to the rear surface 113 in the axial direction. The rear surface 113 is an annular surface which is disposed to surround the plunger 43 and the front surface 114 is an annular surface which is disposed to surround the plunger 43. The front surface 114 is adjacent to the V-packing 120. The rear surface 113 comes into contact with the stepped portion 22.

The inner peripheral surface 111 faces the outer peripheral surface 43a of the plunger 43 inserted through the cylinder portion 21. In an unloaded state (e.g., natural state) in which no external force acts, the inner peripheral surface 111 is parallel to the axis X of the female adapter 110. For example, in the unloaded state, the V-packing 120 is not sandwiched between the male adapter 130 and the female adapter 110.

The outer peripheral surface 112 is on the side opposite to the inner peripheral surface 111 in the radial direction and faces the inner peripheral surface 21a defining the inner space S. In an unloaded state, the outer peripheral surface 112 is parallel to the axis X of the female adapter 110. The rear surface 113 constitutes the rear end of the female adapter 110 and faces the front surface of the stepped portion 22. In an unloaded state, the rear surface 113 is perpendicular to the axis X of the female adapter 110.

The front surface 114 is on the side opposite to the rear surface 113 and faces the adjacent V-packing 120. For example, the front surface 114 comes into contact with the V-packing 120 to hold the V-packing 120. The front surface 114 includes a concave portion (e.g., V groove) 115 which is recessed backward in cross-sectional view. The front surface 114 is an example of the packing holding surface. The concave portion 115 is an example of the adapter concave portion.

In an example, the concave portion 115 includes an outer inclined surface 115a which is inclined backward from the outer peripheral surface 112 toward the axis X and an inner inclined surface 115b which is inclined backward in a direction opposite to the axis X from the inner peripheral surface 111. The outer inclined surface 115a and the inner inclined surface 115b are connected by an R-shaped bottom portion 115c. In cross-sectional view, a V-shaped edge portion is formed by the outer inclined surface 115a, the inner inclined surface 115b, and the bottom portion 115c.

The V-packing 120 has an annular shape. The V-packing 120 has a V-shaped cross-section in cross-sectional view when cutting along a plane including the axis X of the cylinder portion 21. The V-packing 120 includes a convex portion 125 (an example of packing convex portion) on one side of the axial direction and includes a concave portion 126 (an example of packing concave portion) on the opposite side of the convex portion 125 in the axial direction.

At least one V-packing 120 is disposed adjacent to the female adapter 110 in the inner space S so that surround the plunger 43. An example in which one V-packing 120 is disposed is illustrated in FIG. 3, but two or more (a plurality of) V-packings 120 may be arranged. For example, the plurality of V-packings 120 may be arranged side by side in the axial direction. The V-packing 120 includes an inner peripheral surface 121, an outer peripheral surface 122, a rear surface 123 (an example of a second surface), and a front surface 124 (an example of a first surface). The rear surface 123 is located at opposite side to the front surface 124 in the axial direction. The rear surface 123 adjacent to the female adapter 110 includes the convex portion 125. The front surface 124 adjacent to the male adapter 130 includes the concave portion 126.

The inner peripheral surface 121 faces the outer peripheral surface 43a of the plunger 43 inserted through the cylinder portion 21. In an unloaded state, the inner peripheral surface 121 is inclined with respect to the axis X of the V-packing 120 to slightly decrease in diameter forward. The outer peripheral surface 122 is on the side opposite to the inner peripheral surface 121 and faces the inner peripheral surface 21a defining the inner space S. In an unloaded state, the outer peripheral surface 43a is inclined with respect to the axis X of the V-packing 120 to slightly increase in diameter forward.

The rear surface 123 constitutes the rear end of the V-packing 120 and is fitted to the concave portion 115 of the front surface of the female adapter 110. The rear surface 123 includes the annular convex portion 125 which protrudes backward in cross-sectional view. In an example, the convex portion 125 includes an outer inclined surface 125a which is inclined backward from the outer peripheral surface 122 toward the axis X and an inner inclined surface 125b which is inclined backward in a direction opposite to the axis X from the inner peripheral surface 121. The outer inclined surface 125a and the inner inclined surface 125b are connected by an R-shaped top portion 125c. In cross-sectional view, a V-shaped edge portion is formed by the outer inclined surface 125a, the inner inclined surface 125b, and the top portion 125c.

The front surface 124 is on the side opposite to the rear surface 123. When only one V-packing 120 is provided, the front surface 124 faces the adjacent male adapter 130. The front surface 124 includes the concave portion 126 (e.g., V groove) which is recessed backward in cross-sectional view. In an example, the concave portion 126 includes an outer inclined surface 126a which is inclined backward from the outer peripheral surface 122 toward the axis X and an inner inclined surface 126b which is inclined backward in a direction opposite to the axis X from the inner peripheral surface 121. The outer inclined surface 126a and the inner inclined surface 126b are connected by an R-shaped bottom portion 126c. In cross-sectional view, a V-shaped edge portion is formed by the outer inclined surface 126a, the inner inclined surface 126b, and the bottom portion 126c.

The male adapter 130 has an annular shape and is disposed adjacent to the V-packing 120 in the inner space S so that it surrounds the plunger 43. The male adapter 130 is fixed to the cylinder portion 21. When the plurality of V-packings 120 are arranged, the male adapter 130 is disposed adjacent to the V-packing 120 farthest from the female adapter 110. The male adapter 130 includes an inner peripheral surface 131 and an outer peripheral surface 132.

The male adapter 130 includes a rear surface 133 which is adjacent to the V-packing 120 and a front surface 134 which is on the side opposite to the rear surface 133 in the axial direction. The rear surface 133 includes a convex portion 135 (an example of an adapter convex portion) which is formed to surround the plunger 43. The rear surface 133 is an example of the packing sandwiching surface and the convex portion 135 is an example of the adapter convex portion.

The inner peripheral surface 131 faces the outer peripheral surface 43a of the plunger 43 inserted through the cylinder portion 21. The inner peripheral surface 131 is parallel to the axis X of the male adapter 130. The outer peripheral surface 132 is on the side opposite to the inner peripheral surface 131 in the radial direction and faces the inner peripheral surface 21a defining the inner space S. The outer peripheral surface 132 is parallel to the axis X of the male adapter 130. The rear surface 133 constitutes the rear end of the male adapter 130 and is fitted to the concave portion 126 of the front surface 124 of the V-packing 120.

The rear surface 133 includes the annular convex portion 135 which protrudes backward in cross-sectional view. In an example, the convex portion 135 includes an outer inclined surface 135a which is inclined backward from the outer peripheral surface 132 toward the axis X and an inner inclined surface 135b which is inclined backward in a direction opposite to the axis X from the inner peripheral surface 131. The outer inclined surface 135a and the inner inclined surface 135b are connected by the R-shaped top portion 135c. In cross-sectional view, a V-shaped edge portion is formed by the outer inclined surface 135a, the inner inclined surface 135b, and the top portion 135c. The front surface 134 is on the side opposite to the rear surface 133. The front surface 134 is perpendicular to the axis X of the male adapter 130.

The male adapter 130 may be formed of, for example, polyacetal (POM). Further, the male adapter 130 may be formed of a metal material such as brass and stainless steel other than a resin material that undergoes little dimensional change. Further, the V-packing 120 and the female adapter 110 may be formed of homogeneous materials. The homogeneous materials may have mechanical properties that are substantially matched such that the amount of deformation is approximately the same for both the V-packing 120 and the female adapter 110 when they are pressed against each other. Further, the homogeneous materials may have substantially the same strength, rigidity, and the like to the extent that does not hinder the maintenance of the seal structure even if different materials are used for the V-packing 120 and the female adapter 110, or if the homogenous materials are switched or substituted for each other. For example, the V-packing 120 and the female adapter 110 may have 50% or more of common components. In an example, the V-packing 120 and the female adapter 110 may be formed of the same material. For example, both the V-packing 120 and the female adapter 110 may be mainly formed of a resin material. The material forming the V-packing 120 and the female adapter 110 may be a material that has high pressure resistance strength, high temperature resistance, abrasion resistance, flexibility, and small dimensional change due to water absorption, temperature, and the like. An example of such a material is a fluororesin containing a filler. Further, such materials also include super engineering plastics such as polyetheretherketone (PEEK) resins.

In an unloaded state, the diameter R1 of the inner peripheral surface 111 of the female adapter 110 (the inner diameter of the female adapter 110) is larger than the outer diameter of the plunger 43. Further, in an unloaded state, the diameter R2 of the outer peripheral surface of the female adapter 110 (the outer diameter of the female adapter 110) may be the same as or smaller than the inner diameter of the cylinder portion 21 that defines the inner space S.

In an unloaded state, the diameter R3 of the rear end of the inner peripheral surface 121 of the V-packing 120 is larger than the outer diameter of the plunger 43. In an unloaded state, the diameter R4 of the front end of the inner peripheral surface 121 of the V-packing 120 is smaller than the outer diameter of the plunger 43. In an unloaded state, the diameter R5 of the rear end of the outer peripheral surface 122 of the V-packing 120 may be the same as or slightly smaller than the inner diameter of the cylinder portion 21 that defines the inner space S. In an unloaded state, the diameter R6 of the front end of the outer peripheral surface 122 of the V-packing 120 may be larger than the inner diameter of the cylinder portion 21 that defines the inner space S.

The diameter R7 of the inner peripheral surface 131 of the male adapter 130 is larger than the outer diameter of the plunger 43. The diameter R8 of the outer peripheral surface 132 of the male adapter 130 (the outer diameter of the male adapter 130) may be the same as or smaller than the inner diameter of the cylinder portion 21 that defines the inner space S.

Further, in an example, the thickness L1 of the female adapter 110 is larger than the thickness L2 of the V-packing 120. Additionally, the thickness L1 of the female adapter 110 may be the shortest distance between the front surface 114 and the rear surface 113. In some examples, the thickness L1 of the female adapter 110 may be the distance along the axial direction from the bottom portion 115c of the concave portion 115 to the rear surface 113. Further, the thickness L2 of the V-packing 120 may be the shortest distance between the front surface 124 and the rear surface 123. In some examples, the thickness L2 of the V-packing 120 may be the shortest distance from the outer inclined surface 126a of the concave portion 126 to the outer inclined surface 125a of the convex portion 125. Additionally, as shown in the illustrated example of FIG. 3, the thickness L1 along the axial direction from the bottom portion 115c of the concave portion 115 of the female adapter 110 to the rear surface 113 is larger than the distance L3 along the axial direction from the bottom portion 126c of the concave portion 126 of the V-packing 120 to the top portion 125c of the convex portion 125.

Each of the concave portion 115, the convex portion 125, the concave portion 126 and the convex portion 135 has V-shaped cross-sections. The opening angle θ1 between the outer inclined surface 115a and the inner inclined surface 115b that constitute the concave portion 115 of the female adapter 110 is smaller than the opening angle θ2 between the outer inclined surface 125a and the inner inclined surface 125b that constitute the convex portion 125 of the V-packing 120. Further, the opening angle θ3 between the outer inclined surface 126a and the inner inclined surface 126b that constitute the concave portion 126 of the V-packing 120 is smaller than the opening angle θ2 of the V-packing 120. Further, the opening angle θ3 of the V-packing 120 is smaller than the opening angle θ4 between the outer inclined surface 135a and the inner inclined surface 135b that constitute the convex portion 135 of the male adapter 130. In an example, the opening angle θ1 of the concave portion 115 of the female adapter 110 may be the same as the opening angle θ3 of the concave portion 126 of the V-packing 120. Further, the opening angle θ2 of the convex portion 125 of the V-packing 120 may be the same as the opening angle θ4 of the convex portion 135 of the male adapter 130.

The seal structure body 100 is sandwiched by the communicating pipe 25 and the stepped portion 22 in the axial direction. The male adapter 130 and the female adapter 110 sandwich the V-packing 120 in the axial direction. The female adapter 110 has an end portion 110a located adjacent to the V-packing 120. The end portion 110a includes the concave portion 115. In the state in which the male adapter 130 and the female adapter 110 sandwich the V-packing 120, the concave portion 115 receives the convex portion 125 of the V-packing 120 and the convex portion 126 of the V-packing 120 receives the convex portion 135 of the male adapter 130.

The inner diameter of the front surface 114 is smaller than the diameter of the plunger 43 when the plunger 43 is not disposed in the cylinder portion 21. For example, in the state in which the male adapter 130 and the female adapter 110 sandwich the V-packing 120, the concave portion 115 of the female adapter 110 is slightly enlarged by the convex portion 125 of the V-packing 120. Accordingly, the diameter of the front end of the inner peripheral surface 111 of the female adapter 110 is smaller than the diameter of the plunger 43 when the plunger 43 is not disposed in the cylinder portion 21. Further, the diameter of the front end of the outer peripheral surface 112 of the female adapter 110 is larger than the diameter (inner diameter) of the cylinder portion 21 when the female adapter 110 is not disposed in the cylinder portion 21.

In some examples, in the state in which the male adapter 130 and the female adapter 110 sandwich the V-packing 120 in the inner space S of the cylinder portion 21, a portion (inner diameter side portion) of the female adapter 110 having a diameter that is smaller than the diameter of the plunger 43 at the tip of the concave portion 115 of the female adapter 110 provides a sealing function for the plunger 43 and a portion (outer diameter side portion) of the female adaptor 110 having a diameter that is larger than the diameter of the cylinder portion 21 provides a sealing function for the cylinder portion 21.

Additionally, the tip of the concave portion 126 of the V-packing 120 has an inner diameter that is smaller than the diameter of the plunger 43 and an outer diameter that is larger than the diameter of the cylinder portion 21 even in an unloaded state and provides a sealing function for the plunger 43 and the cylinder portion 21. In a state in which the male adapter 130 and the female adapter 110 sandwich the V-packing 120, the concave portion 126 of the V-packing 120 may be further enlarged by the male adapter 130.

In an example reciprocating pump 1, the reciprocating member 40 connected to the crankshaft 12 through the connecting rod 13 and the piston pin 15 moves in a reciprocating manner as the crankshaft 12 rotates. In a water absorption step, the plunger 43 retreats toward the drive unit so that the pump chamber 32 has a negative pressure. Since the pump chamber 32 has a negative pressure, the valve assembly 50 for water absorption is opened and the valve assembly 70 for discharge is closed. Accordingly, the working liquid is sucked into the pump chamber 32 through the inlet 28 and the valve assembly 50. On the other hand, in a discharge step, the plunger 43 advances toward the pump chamber 32 so that the pump chamber 32 is pressurized. Since the pump chamber 32 is pressurized, the valve assembly 50 for water absorption is closed and the valve assembly 70 for discharge is opened. Accordingly, the working liquid of the pump chamber 32 is discharged to the outlet 38 through the valve assembly 70.

In an example reciprocating pump 1, since the end portion of the V-packing 120 has an inner diameter that is smaller than the diameter of the plunger 43 and an outer diameter that is larger than the diameter of the inner space S of the cylinder portion 21, the end portion of the V-packing 120 provides a sealing function for the inner peripheral surface 21a defining the plunger 43 and the inner space S. Further, since the end portion 110a of the female adapter 110 has an inner diameter that is smaller than the diameter of the plunger 43 and an outer diameter that is larger than the diameter of the inner space S, the end portion 110a of the female adapter 110 also provides a sealing function for the inner peripheral surface 21a defining the plunger 43 and the inner space S. In this way, since the female adapter 110 may be used to position and sandwich the V-packing 120 also has a function of a seal, the number of the V-packings 120 in use can be decreased. Therefore, manufacturing costs can be controlled.

Further, since the number of the V-packings 120 used for the seal structure decreases, variation in tolerance caused by overlapping the V-packings 120 can be suppressed.

Further, a female adapter 110 formed of a resin material may seal a gap between the plunger and the cylinder portion without damaging the plunger surface.

Further, the thickness of the female adapter 110 and the V-packing 120 affects the pressure resistance strength. In an example seal structure body 100, since the thickness L1 of the female adapter 110 is formed to be larger than the thickness L2 of the V-packing 120, the female adapter 110 may obtain pressure resistance strength even in a configuration including one female adapter 110 and one V-packing 120 as in the illustrated example of FIG. 3.

In an example, the end portion 110a facing the V-packing 120 in the female adapter 110 may have an inner diameter that is larger than the diameter of the plunger 43 in an unloaded state. The end portion 110a has the concave portion 115 attached to the convex portion 125 of the V-packing 120. In an example, the concave portion 115 of the female adapter 110 can be enlarged as the female adapter 110 is relatively pressed by the V-packing 120 while the male adapter 130 and the female adapter 110 sandwich the V-packing 120. Accordingly, the end portion 110a (e.g., the tip of the concave portion) of the female adapter 110 provides a sealing function. In examples in which the inner peripheral surface 111 and the outer peripheral surface 112 of the female adapter 110 are parallel to the axial direction, the female adapter 110 can be manufactured at low cost.

In an example, the angle θ2 formed by two sides forming the convex portion 125 in a cross-sectional view of the V-packing 120 may be larger than the angle θ1 formed by two sides forming the concave portion 115 in the cross-sectional view of the female adapter 110. In this configuration, the concave portion 115 of the female adapter 110 can be readily enlarged by the convex portion 125 of the V-packing 120 while the male adapter 130 and the female adapter 110 sandwich the V-packing 120.

In an example, at least one V-packing 120 and the female adapter 110 may be formed of homogeneous materials. In this case, at least one V-packing 120 and the female adapter 110 may have 50% or more of common components. In this configuration, since the V-packing 120 and the female adapter 110 act as if they are pressed against each other and act integrally while the male adapter 130 and the female adapter 110 sandwich the V-packing 120, the pressure resistance strength increases.

Figure 4:
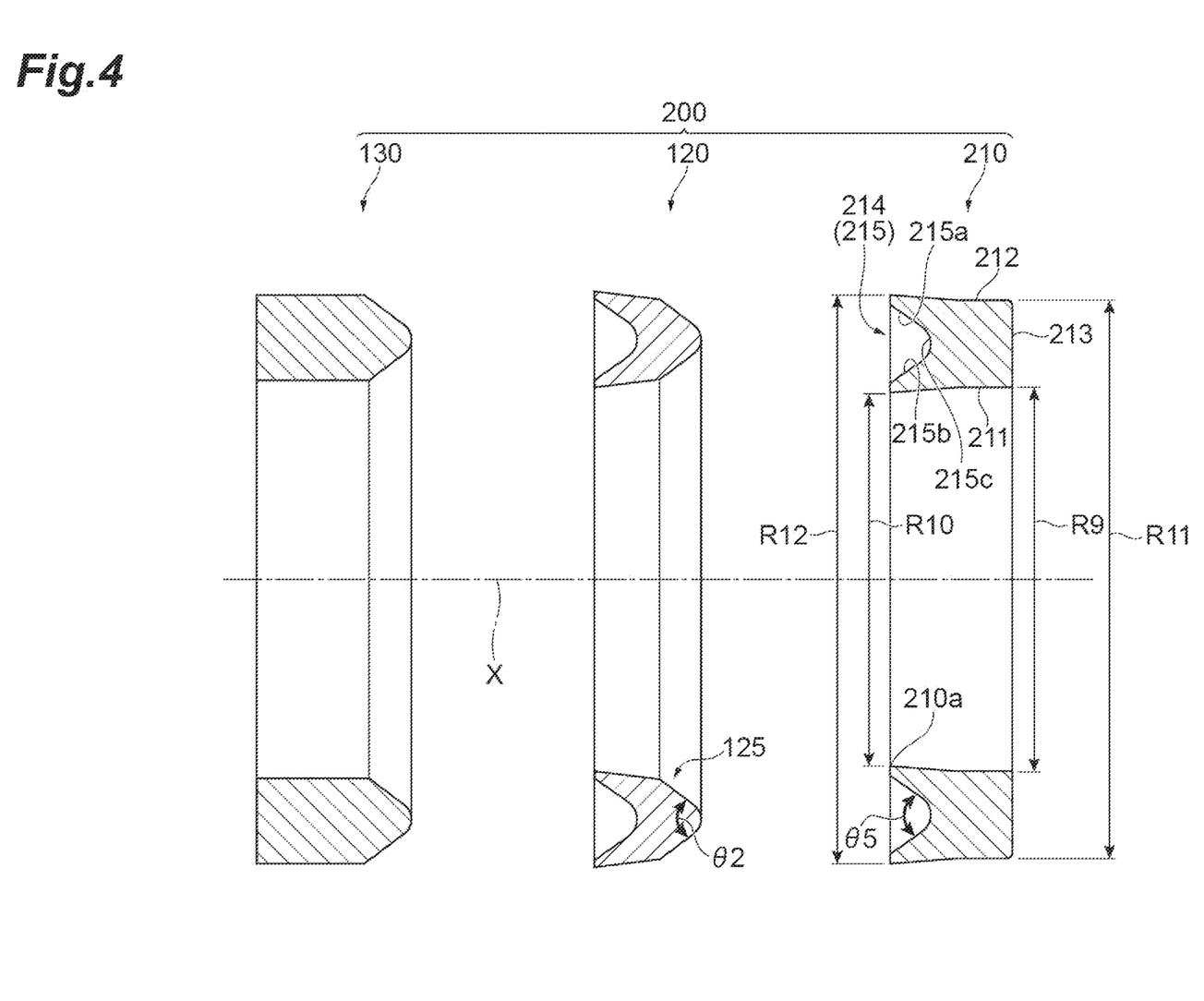
FIG. 4 is an exploded cross-sectional view describing another example seal structure.

FIG. 4 is an exploded cross-sectional view illustrating a seal structure according to another example. A seal structure body 200 illustrated in FIG. 4 includes a female adapter 210 instead of the female adapter 110 constituting the seal structure illustrated in FIG. 3. The configuration of the male adapter 130 and the V-packing 120 is the same as the configuration of FIG. 3.

The female adapter 210 includes an inner peripheral surface 211, an outer peripheral surface 212, a rear surface 213, and a front surface 214 and includes a concave portion 215 formed on the front surface 214 adjacent to the V-packing 120. The inner peripheral surface 211 faces the outer peripheral surface 43a of the plunger 43 which is inserted through the cylinder portion 21. In an unloaded state, the inner peripheral surface 211 is inclined with respect to the axis X to slightly decrease in diameter forward. The outer peripheral surface 212 is on the side opposite to the inner peripheral surface 211 and faces the inner peripheral surface 21a that defines the inner space S. In an unloaded state, the outer peripheral surface 212 is inclined with respect to the axis X to slightly increase in diameter forward. The rear surface 213 constitutes the rear end of the female adapter 210 and faces the front surface 22a of the stepped portion 22. In an unloaded state, the rear surface 213 is perpendicular to the axis X of the female adapter 210. The front surface 214 is on the side opposite to the rear surface 213 and faces the adjacent V-packing 120. The front surface 214 includes the concave portion 215 (V groove) which is recessed backward in cross-sectional view. In an example, the concave portion 215 includes an outer inclined surface 215a which is inclined backward from the outer peripheral surface 212 toward the axis X and an inner inclined surface 215b which is inclined backward in a direction opposite to the axis X from the inner peripheral surface 211. The outer inclined surface 215a and the inner inclined surface 215b are connected by an R-shaped bottom portion 215c.

In an unloaded state, the diameter R9 of the rear end of the inner peripheral surface 211 of the female adapter 210 is larger than the outer diameter of the plunger 43. In an unloaded state, the diameter R10 of the front end of the inner peripheral surface 211 of the female adapter 210 is smaller than the outer diameter of the plunger 43. In an unloaded state, the diameter R11 of the rear end of the outer peripheral surface 212 of the female adapter 210 may be the same as or slightly smaller than the inner diameter of the cylinder portion 21 that defines the inner space S. In an unloaded state, the diameter R12 of the front end of the outer peripheral surface 212 of the female adapter 210 is larger than the inner diameter of the cylinder portion 21 that defines the inner space S. The opening angle θ5 between the outer inclined surface 215a and the inner inclined surface 215b that constitute the concave portion 215 of the female adapter 210 is smaller than the opening angle θ2 of the convex portion 125 of the V-packing 120.

As described above, in the example of FIG. 4, the end portion 210a (an example of an adapter end portion) facing the V-packing 120 in the female adapter 210 has an inner diameter that is smaller than the diameter of the reciprocating member in an unloaded state. In this configuration, since the tip of the concave portion 215 of the female adapter 210 provides a sealing function even in a state in which the female adapter 210 is not relatively pressed by the V-packing 120, the female adapter 210 can reliably slide on the plunger 43.

Some examples based on the drawings are disclosed as follows.

An example seal structure (100) is disposed between a space forming member (21) forming a columnar inner space (S) and a columnar reciprocating member (40) moving in a reciprocating manner in an axial direction in the inner space (S). The seal structure (100) includes an annular female adapter (110) which is disposed in the inner space (S), at least one annular V-packing (120) which is disposed adjacent to the female adapter (110) and an annular male adapter (130) which is disposed adjacent to the at least one V-packing (120). The at least one V-packing (120) has a V-shaped cross-section including a convex portion (125) formed on a side surface (e.g., rear surface 123) adjacent to the female adapter (110) and a concave portion (126) formed on a side surface (e.g., rear surface 124) adjacent to the male adapter (130). The male adapter (130) includes a convex portion (135) which is formed on a side surface (e.g., rear surface 133) adjacent to the at least one V-packing (120) to come into contact with the concave portion (126). The female adapter (110) includes a concave portion (115) which is formed on a side surface (e.g., front surface 114) adjacent to the at least one V-packing (120) to come into contact with the convex portion (125). Both the at least one V-packing (120) and the female adapter (110) are mainly formed of a resin material. The male adapter (130) and the female adapter (110) sandwich the at least one V-packing (120) in the axial direction. In a state in which the male adapter (130) and the female adapter (110) sandwich the at least one V-packing (120) in the axial direction, an end portion facing the male adapter (130) in the at least one V-packing (120) has an inner diameter that is smaller than the diameter of the reciprocating member and an outer diameter that is larger than the diameter of the inner space (S) and an end portion facing the at least one V-packing (120) in the female adapter (110) has an inner diameter that is smaller than the diameter of the reciprocating member (40) and an outer diameter that is larger than the diameter of the inner space (S).

In the example seal structure (100), an end portion of at least one V-packing (120) has an inner diameter that is smaller than the diameter of the plunger (43) constituting the reciprocating member (40) and an outer diameter that is larger than the diameter of the inner space (S) of the cylinder portion (21) as the space forming member. According to the example seal structure (100), an end portion of the V-packing (120) provides a sealing function for the inner peripheral surface (21a) defining the plunger (43) and the inner space (S). As a result, the V-packing (120) seals a gap between the cylinder portion (21) and the plunger (43). An end portion of the female adapter (110) has an inner diameter that is smaller than the diameter of the plunger (43) and an outer diameter that is larger than the diameter of the inner peripheral surface (21a). Therefore, an end portion of the female adapter (110) also provides a sealing function for the inner peripheral surface (21a) defining the plunger (43) and the inner space (S). As a result, the female adapter (110) seals a gap between the cylinder portion (21) and the plunger (43). Accordingly, the female adapter (110) used to position and sandwich the V-packing (120) can also have a function of a seal and the number of the V-packings (120) in use can be decreased.

In some examples, an end portion (110a, 210a) facing the at least one V-packing (120) in the female adapter (110) has an inner diameter that is larger than the diameter of the reciprocating member (40) in an unloaded state. When the female adapter (110) is relatively pressed by the V-packing (120) in a state in which the male adapter (110) and the female adapter (110) sandwich the V-packing (120), the concave portion (115) of the female adapter is enlarged. Accordingly, the tip of the concave portion (115) of the female adapter (110) provides a sealing function.

In some examples, an end portion facing the at least one V-packing (120) in the female adapter (110) has an inner diameter that is smaller than the diameter of the reciprocating member (40) in an unloaded state. Since the tip of the concave portion (115) of the female adapter (110) may be configured to provide a sealing function even in a state in which the female adapter (110) is not relatively pressed by the V-packing (120), the female adapter (120) can reliably slide on the reciprocating member.

In some examples, an angle (θ2) formed by two sides forming the convex portion (125) in a cross-sectional view of the at least one V-packing (120) is larger than an angle (θ1) formed by two sides forming the concave portion (115) in a cross-section of the female adapter (110). Accordingly, the convex portion (125) of the V-packing (120) can readily enlarge the concave portion (115) of the female adapter (110) while the male adapter (130) and the female adapter (110) sandwich the V-packing (120).

In some examples, the at least one V-packing (120) and the female adapter (110) are formed of homogeneous materials. At least one V-packing (120) and the female adapter (110) may have 50% or more of common components. Since the V-packing (120) and the female adapter (110) may be configured to integrally act while the male adapter (130) and the female adapter (110) sandwich the V-packing (120), the pressure resistance strength increases.

Additionally, an example reciprocating pump (1) includes a cylinder portion (21) which includes an inner peripheral surface (21a) defining a columnar inner space (S) and a columnar plunger (43) which moves in a reciprocating manner in an axial direction in the inner space (S) of the cylinder portion (21). The reciprocating pump (1) includes an annular female adapter (110) which is disposed to come into contact with the inner peripheral surface (21a), at least one annular V-packing (120) which is disposed adjacent to the female adapter (110), and an annular male adapter (130) which is disposed adjacent to the at least one V-packing (120). The at least one V-packing (120) has a V-shaped cross-section including a convex portion (125) formed on a side surface (e.g., rear surface 123) adjacent to the female adapter (110) and a concave portion (126) formed on a side surface (e.g., front surface 124) adjacent to the male adapter (130). The male adapter (130) includes a convex portion (135) which is formed on a side surface (e.g., rear surface 133) adjacent to the at least one V-packing (120) to come into contact with the concave portion (126). The female adapter (110) includes a concave portion (115) which is formed on a side surface (e.g., front surface 114) adjacent to the at least one V-packing (120) to come into contact with the convex portion (125). Both the at least one V-packing (120) and the female adapter (110) are mainly formed of a resin material. The male adapter (130) and the female adapter (110) sandwich the at least one V-packing (120) in the axial direction. In a state in which the male adapter (130) and the female adapter (110) sandwich the at least one V-packing (120) in the axial direction, an end portion facing the male adapter (130) in the at least one V-packing (120) has an inner diameter that is smaller than a diameter of the plunger and an outer diameter that is larger than a diameter of the inner space (S) and an end portion facing the at least one V-packing (120) in the female adapter (110) has an inner diameter that is smaller than the diameter of the plunger and an outer diameter that is larger than the diameter of the inner space (S).

It is to be understood that not all aspects, advantages and features described herein may necessarily be achieved by, or included in, any one particular example. Indeed, having described and illustrated various examples herein, it should be apparent that other examples may be modified in arrangement and detail. For example, the seal structure is applied may be not only the inside of the cylinder adjacent to the pump chamber, but also the inside of the cylinder disposed in other parts.

What is claimed is:

1. A reciprocating pump comprising:
   a first manifold including a cylinder portion;
   a second manifold connected to the first manifold, which includes a pump chamber;
   a communicating pipe including a first end located in the cylinder portion of the first manifold and a second end located in the pump chamber of the second manifold, wherein the communicating pipe fluidly couples the pump chamber to the cylinder portion;
   a plunger which is located in the cylinder portion and moves in a reciprocating manner in an axial direction in the cylinder portion; and
   a seal structure located in the cylinder portion, the seal structure including:
   an annular first adapter that surrounds the plunger;
   an annular second adapter that surrounds the plunger; and
   an annular packing located between the first adapter and the second adapter in the axial direction and contacts an outer peripheral surface of the plunger,
   wherein the first adapter and the second adapter sandwich the packing in the axial direction,
   wherein an inner diameter of the first adapter is smaller than an outer diameter of the plunger,
   wherein the first end of the communicating pipe contacts the second adapter in the axial direction,
   wherein the cylinder portion comprises an annular protruding stepped portion that protrudes toward an axis of the cylinder portion from an inner periphery of the cylinder portion, and
   wherein the first end of the communicating pipe and the protruding stepped portion of the cylinder portion sandwich the seal structure in the axial direction.

2. The reciprocating pump according to claim 1,
   wherein the packing comprises a packing convex portion that contacts the first adapter, and
   wherein the first adapter comprises:
      an adapter concave portion attached to the packing convex portion, and
      a rear portion located at an opposite side to the adapter concave portion in the axial direction and that contacts the protruding stepped portion.

3. The reciprocating pump according to claim 2, wherein the first adapter is configured so that an inner diameter becomes smaller than an outer diameter of the plunger when the packing convex portion is received in the adapter concave portion to enlarge the adapter concave portion.

4. The reciprocating pump according to claim 2,
   wherein the second adapter comprises an adapter convex portion that contacts the packing, and
   wherein the packing includes a packing concave portion located at an opposite side to the packing convex portion and attached to the adapter convex portion.

5. The reciprocating pump according to claim 4, wherein the packing concave portion is configured to be enlarged when the adapter convex portion enters the packing concave portion.

6. The reciprocating pump according to claim 2, wherein the packing comprises:
   a packing convex portion; and
   a packing concave portion located at an opposite side to the packing convex portion in the axial direction,
   wherein the first adapter comprises an adapter concave portion that contacts the packing convex portion, and
   wherein the second adapter comprises an adapter convex portion that contacts the packing concave portion.

7. The reciprocating pump according to claim 6,
   wherein the packing convex portion and the adapter concave portion comprise V-shaped cross-sections, and
   wherein an angle formed by two sides forming the adapter concave portion in a cross-sectional view of the first adapter is smaller than an angle formed by two sides forming the packing convex portion in a cross-sectional view of the packing in an unloaded state in which the packing is not sandwiched between the first adapter and the second adapter.

8. The reciprocating pump according to claim 6,
   wherein the packing concave portion and the packing convex portion comprise V-shaped cross-sections, and
   wherein an angle formed by two sides forming the packing concave portion in a cross-sectional view of the packing is smaller than an angle formed by the two sides forming the packing convex portion in an unloaded state in which the packing is not sandwiched between the first adapter and the second adapter.

9. The reciprocating pump according to claim 6,
   wherein the packing concave portion and the adapter convex portion comprise V-shaped cross-sections, and
   wherein an angle formed by two sides forming the packing concave portion in a cross-sectional view of the packing is smaller than an angle formed by two sides forming the adapter convex portion in a cross-sectional view of the second adapter in an unloaded state in which the packing is not sandwiched between the first adapter and the second adapter.

10. The reciprocating pump according to claim 1, wherein the second adapter includes an outer diameter that is smaller than an inner diameter of the cylinder portion.

11. The reciprocating pump according to claim 1,
   wherein the communicating pipe includes an annular protruding stepped portion which protrudes outward in a radial direction, and
   wherein the cylinder portion includes an annular recessed stepped portion which is recessed outward in the radial direction and comes into contact with the protruding stepped portion of the communicating pipe to position the communicating pipe.

12. The reciprocating pump according to claim 11,
   wherein the recessed stepped portion of the cylinder portion abuts the protruding stepped portion of the communicating pipe, and wherein the second manifold abuts the protruding stepped portion such that the protruding stepped portion is located between the second manifold and the recessed stepped portion.

13. The reciprocating pump according to claim 1, further comprising an O-ring configured to seal a gap between an outer periphery of the communicating pipe and an inner periphery of the pump chamber.

14. The reciprocating pump according to claim 1, further comprising an O-ring configured to seal a gap between an outer periphery of the communicating pipe and an inner periphery of the cylinder portion.

15. The reciprocating pump according to claim 1, wherein the first adapter comprises:
   a rear portion that abuts the protruding stepped portion; and
   an adapter concave portion located at a front portion of the first adapter opposite the rear portion in the axial direction; and
   wherein the packing comprises a packing convex portion that is press-fit into the adapter concave portion.

16. The reciprocating pump according to claim 15,
   wherein the packing convex portion is located at a first side of the packing,
   wherein the packing includes a packing concave portion located at a second side of the packing opposite the first side in the axial direction,
   wherein the second adapter includes an adapter convex portion that is press-fit into the packing concave portion, and
   wherein the communicating pipe comprises a rear surface that abuts the second adapter.

* * * * *